Patented June 3, 1952

2,598,898

UNITED STATES PATENT OFFICE 2,598,898

METHOD FOR THE PURIFICATION OF TITANIUM TETRACHLORIDE

Helmut Espenschied, Metuchen, N. J., assignor to National Lead Company, New York, N. Y., a corporation of New Jersey No Drawing. Application February 8, 1951, Serial No. 210,090

8 Claims. (Cl. 202—57)

This invention relates to a method for the purification of titanium tetrachloride. More specifically it relates to a simple and economical process for purifying the so-called "commercial grade" or "crude" titanium tetrachloride.

Crude titanium tetrachloride as manufactured and sold as an article of commerce is a relatively impure product which has a decidedly deep, yellow color. This material may be commercially prepared by processes involving the chlorination of titaniferous iron ores or rutile ores and invariably the product is contaminated by various impurities, which are likewise chlorinated or are carried over with the titanium values.

The crude titanium tetrachloride is unsuitable as a raw material in various processes, which demand high purity such as in the manufacture of titanium metal, titanium pigments and other titanium compounds. In these processes the crude titanium tetrachloride must be purified before it can be utilized.

Operational difficulties are usually encountered in prior methods for the purification of titanium tetrachloride, because of the type and nature of the treating agents employed. Some of these agents are added in large quantities to the titanium tetrachloride, which in itself is uneconomical, while agents form bulky and sticky masses which are inconvenient and not easily handled. Another difficulty sometimes encountered is in the loss of unrecoverable titanium tetrachloride, which is retained by the bulky residual treating agent. These and other difficulties are overcome by the process of the present invention.

An object of this invention is to present an improved method for the purification of titanium tetrachloride. A further object is to purify crude titanium tetrachloride in a convenient manner. Another object of this invention is to purify titanium tetrachloride by a process which involves minimum handling loss. These and other objects will become apparent from the following more complete description of this invention.

In its broadest aspects this invention contemplates a process for purifying crude titanium tetrachloride by admixing crude titanium tetrachloride with at least one agent selected from a group consisting of iodine and iodide compounds of sodium, potassium, monovalent copper, magnesium, calcium, and aluminum, and distilling the treated titanium tetrachloride to recover the purified tetrachloride therefrom.

According to this invention the impure tetrachloride is admixed with a very small quantity of one of the agents mentioned above. The treated solution is merely heated to boiling and distilled to obtain substantially pure titanium tetrachloride. Most of the previously described methods for purification call for extended refluxing periods before the treating agents have had sufficient time to take effect, but according to this invention the only time required is that of heating the treated liquid to the boiling temperature and during the subsequent distilling operation to obtain the pure produce.

The quantity of the treating agent required is dependent upon the type of starting material employed. When large quantities of impurities are present in the crude titanium tetrachloride, it is necessary to add larger amounts of treating agents to obtain a purified produce.

A typical example of the range of treating agents necessary for the removal of impurities such as vanadium and silicon from the crude tetrachloride is as follows:

A sample of crude titanium tetrachloride containing 0.015% V and 0.01% $SiO_2$ required for purification about 0.02% to about 0.3% preferably about 0.05%–0.2% treating agent calculated on the weight basis of the titanium tetrachloride. Crude tetrachloride usually contains impurities in the order and magnitude given above.

In order to more fully illustrate this invention, the following examples are presented:

*Example I*

1,000 parts of crude titanium tetrachloride having the analysis given above were placed in a distilling flask. 0.3 parts of potassium iodide were added to the titanium tetrachloride at room temperature. The mixture was then rapidly heated to boiling and distilled at normal pressure out of contact with the ouside atmosphere. The distillate was condensed and analyzed. The entire procedure was carried out in glass apparatus to prevent contamination. The purified titanium tetrachloride possessed a water-white color. The analytical data are presented in Table I.

Example II

Example I was repeated using another 1,000 parts of the same crude titanium tetrachloride but 2 parts of iodine were added to the liquid instead of potassium iodide. The analytical data are also presented in Table I.

Examples III, IV, V, and VI

Example I was repeated except that 2 parts of the following compounds were added to the crude titanium tetrachloride: calcium iodide, magnesium iodide, cuprous iodide, aluminum iodide. The analysis of the purified titanium tetrachloride is presented in Table I.

*Table I*

| Example No. | Titanium Tetrachloride parts | Treating Agents Added parts | Color | Impurities in Distillate Per Cent V |
|---|---|---|---|---|
| 1 | 1,000 | 0.3 potassium iodide | water-white | 0.002 |
| 2 | 1,000 | 2.0 iodine | do | 0.002 |
| 3 | 1,000 | 2.0 calcium iodide | do | <0.002 |
| 4 | 1,000 | 2.0 magnesium iodide | do | <0.002 |
| 5 | 1,000 | 2.0 cuprous iodide | do | <0.002 |
| 6 | 1,000 | 2.0 aluminum iodide | do | 0.003 |
| Untreated crude titanium tetrachloride. | | none | yellow | 0.015 |

From the above examples it is evident that crude titanium tetrachloride may be purified particularly with respect to vanadium. The impurities, particularly vanadium, have been eliminated to the extent that the purified titanium tetrachloride becomes a commercially acceptable product.

It has further been shown that the process of the instant invention is convenient to employ because the treating agents are added in small quantities and therefore do not form bulky and gummy still bottoms.

The titanium tetrachloride removed with the treating agents is easily recovered from the small residual mass by heating and is returned to the system. The ability to heat the treating agents without sticking to the walls of the vessel and without retaining an appreciable amount of titanium tetrachloride in the residual treating agents results in minimizing the titanium tetrachloride handling losses of the process.

While this invention has been described and illustrated by the examples shown, it is not intended to be strictly limited thereto and other modifications and variations may be employed within the scope of the following claims.

I claim:
1. Method for the purification of titanium tetrachloride which comprises admixing crude titanium tetrachloride with at least one agent selected from the group consisting of iodine and the iodide compounds of sodium, potassium, monovalent copper, magnesium, calcium, and aluminum, heating the mixture to a boiling temperature and distilling the treated titanium tetrachloride to recover purified titanium tetrachloride therefrom as a distillate.
2. Method according to claim 1 in which the treating agent is iodine.
3. Method according to claim 1 in which the treating agent is potassium iodide.
4. Method according to claim 1 in which the treating agent is sodium iodide.
5. Method according to claim 1 in which the treating agent is magnesium iodide.
6. Method according to claim 1 in which the treating agent is calcium iodide.
7. Method according to claim 1 in which the amount of treating agent employed is from about 0.02% to about 0.3%, calculated on the weight basis of the titanium tetrachloride.
8. Method according to claim 1 in which the treating agent is employed in amount from about 0.05% to 0.2% calculated on the weight basis of the titanium tetrachloride.

HELMUT ESPENSCHIED.

REFERENCES CITED

The following references are of record in the file of this patent:

UNITED STATES PATENTS

| Number | Name | Date |
|---|---|---|
| 2,416,191 | Meister | Feb. 18, 1947 |
| 2,560,423 | Espenschied | July 10, 1951 |
| 2,560,424 | Espenschied | July 10, 1951 |